United States Patent
Fujiwara et al.

(10) Patent No.: US 7,287,914 B2
(45) Date of Patent: Oct. 30, 2007

(54) OPTICAL CONNECTOR ASSEMBLY, CONNECTOR HOLDER, AND OPTICAL CONNECTOR

(75) Inventors: Kunihiko Fujiwara, Sakura (JP); Takaaki Ishikawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/258,915

(22) Filed: Oct. 27, 2005

(65) Prior Publication Data

US 2006/0098923 A1 May 11, 2006

Related U.S. Application Data

(63) Continuation of application No. PCT/JP2004/006120, filed on Apr. 28, 2004.

(30) Foreign Application Priority Data

Apr. 30, 2003 (JP) ............... 2003-125350

(51) Int. Cl.
    G02B 6/36 (2006.01)
(52) U.S. Cl. ............... 385/88; 385/52; 385/53
(58) Field of Classification Search ......... 385/88–96, 385/147, 14, 52–75, 139
    See application file for complete search history.

(56) References Cited

U.S. PATENT DOCUMENTS

| | | | |
|---|---|---|---|
| 4,762,389 A | | 8/1988 | Kaihara |
| 5,168,537 A | * | 12/1992 | Rajasekharan et al. ....... 385/89 |
| 5,195,154 A | * | 3/1993 | Uchida ................ 385/88 |
| 5,325,455 A | * | 6/1994 | Henson et al. ............ 385/89 |
| 5,515,468 A | | 5/1996 | DeAndrea et al. |
| 5,708,743 A | | 1/1998 | DeAndrea et al. |
| 5,719,979 A | * | 2/1998 | Furuyama ................ 385/89 |
| 6,132,107 A | | 10/2000 | Morikawa |
| 6,364,542 B1 | | 4/2002 | Deane et al. |
| 6,491,447 B2 | | 12/2002 | Aihara |
| 6,516,104 B1 | * | 2/2003 | Furuyama ................ 385/14 |
| 6,901,185 B2 | * | 5/2005 | Sasaki et al. ............ 385/33 |
| 2003/0081878 A1 | * | 5/2003 | Joyner et al. ............ 385/14 |
| 2006/0098923 A1 | | 5/2006 | Fujiwara et al. |
| 2006/0210225 A1 | | 9/2006 | Fujiwara et al. |

FOREIGN PATENT DOCUMENTS

| | | |
|---|---|---|
| JP | 60-205512 A | 10/1985 |
| JP | 2-220013 A | 9/1990 |
| JP | 04-333806 A | 11/1992 |
| JP | 6-62561 A | 9/1994 |
| JP | 6-273641 A | 9/1994 |
| JP | 6-317726 A | 11/1994 |
| JP | 7-318758 A | 12/1995 |
| JP | 8-160262 A | 6/1996 |
| JP | 10-221559 A | 8/1998 |

(Continued)

*Primary Examiner*—Kevin S. Wood
(74) *Attorney, Agent, or Firm*—Sughrue Mion, PLLC

(57) ABSTRACT

An optical connector assembly includes a substrate including a connection surface and an optical element, an optical connector on a distal end of an optical fiber, and a positioning mechanism, that positions the optical fiber with respect to the optical element to provide an optical connection therebetween, the positioning mechanism including a positioning projection on one of the optical connector and the substrate and a corresponding positioning hole on the other of the optical connector and the substrate.

23 Claims, 7 Drawing Sheets

FOREIGN PATENT DOCUMENTS

| | | |
|---|---|---|
| JP | 2000-199833 A | 7/2000 |
| JP | 2000-221364 A | 8/2000 |
| JP | 2000-292658 A | 10/2000 |
| JP | 2001-296449 A | 10/2001 |
| JP | 2001-324649 A | 11/2001 |
| JP | 2002-6175 A | 1/2002 |
| JP | 2002-076374 A | 3/2002 |
| JP | 2002-090586 A | 3/2002 |
| JP | 2003-207694 A | 7/2003 |
| JP | 2004-191564 A | 7/2004 |
| KP | 5-15009 U | 2/1993 |

\* cited by examiner

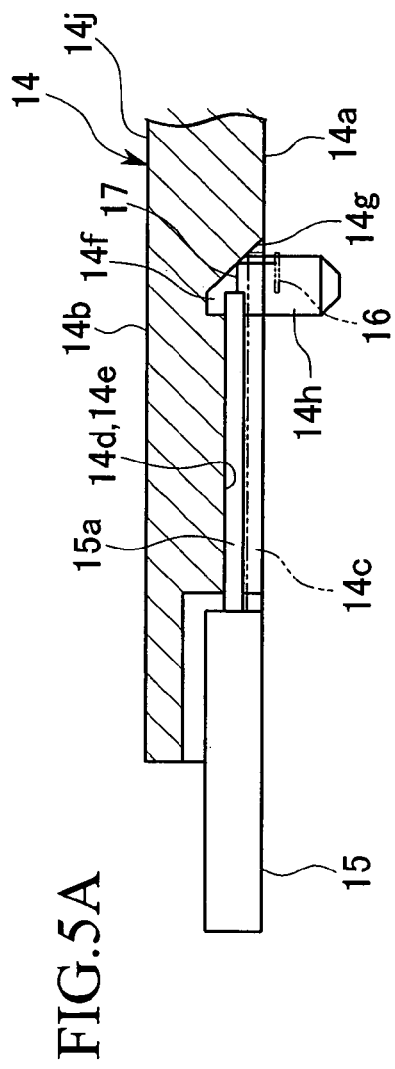
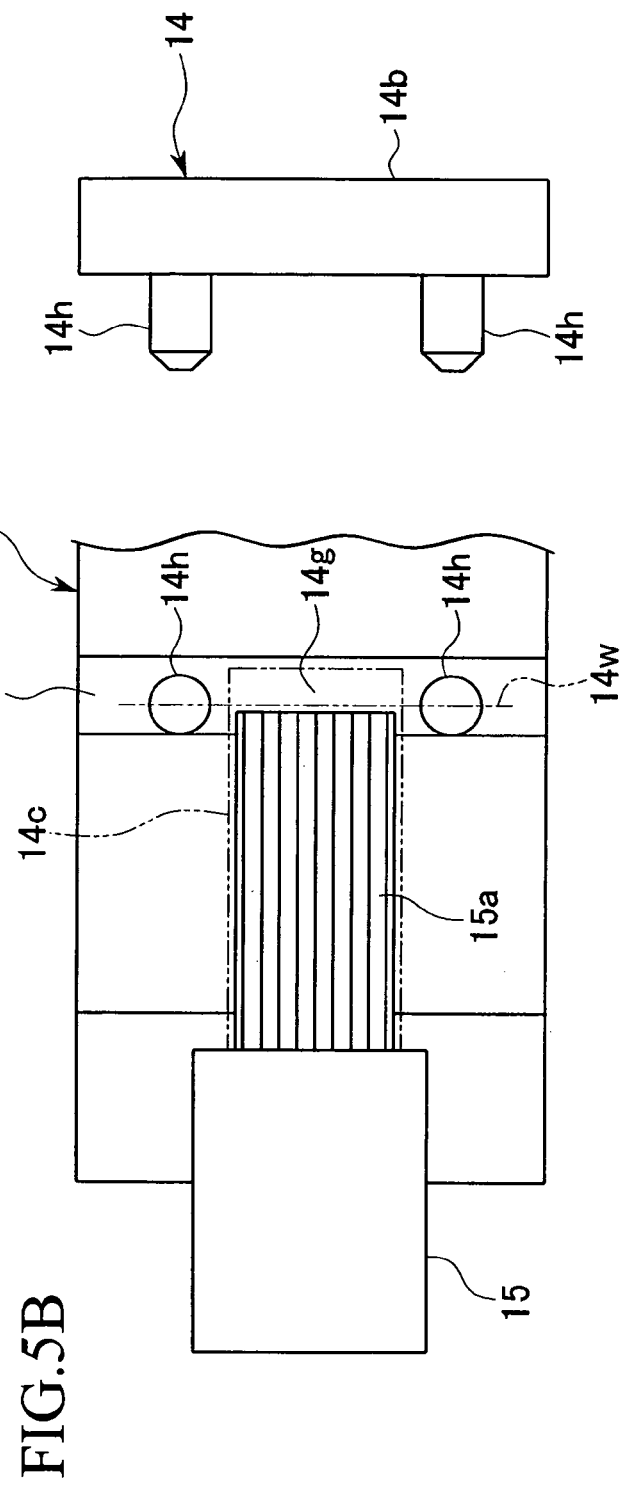
FIG.5A
FIG.5B
FIG.5C

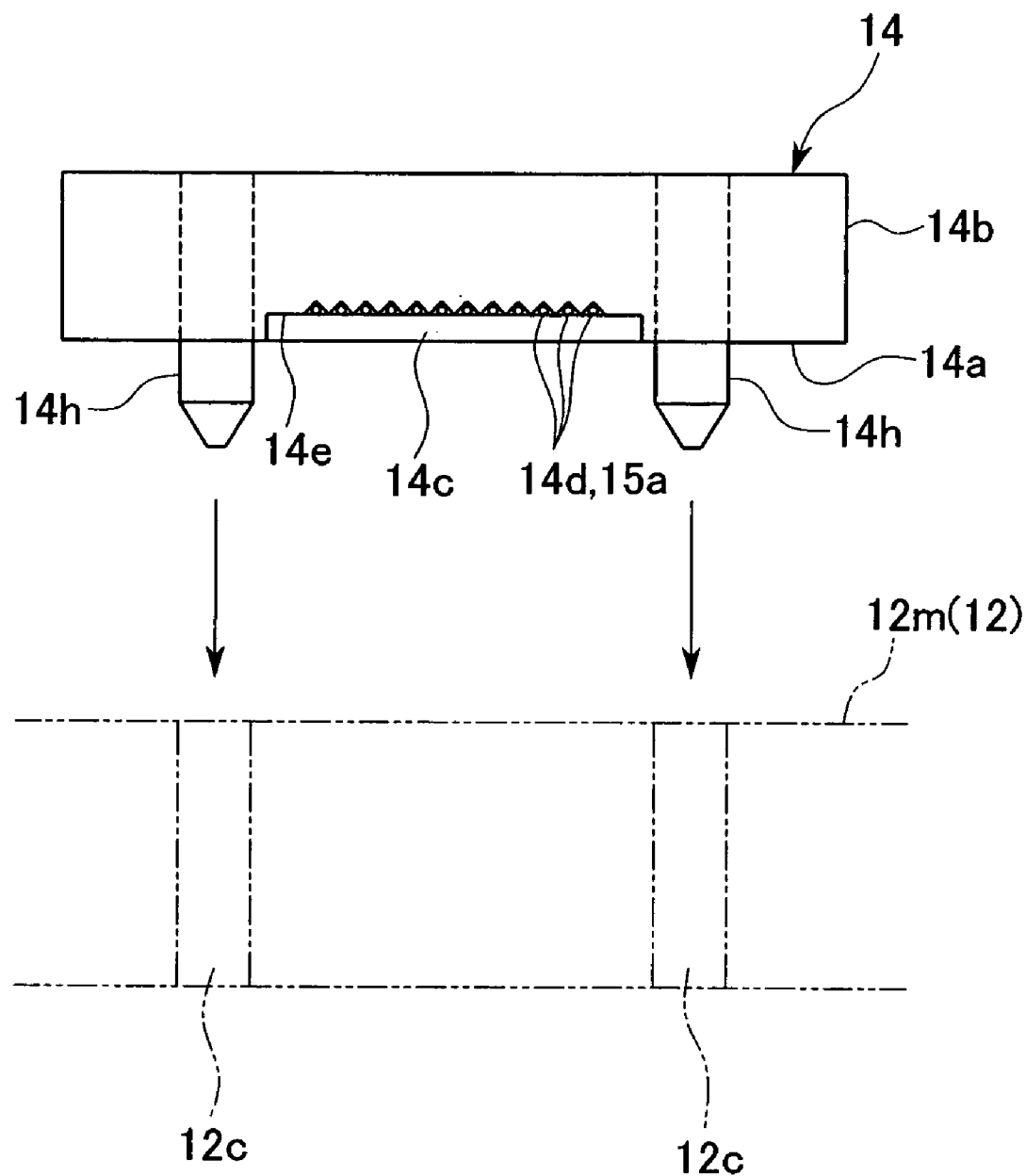

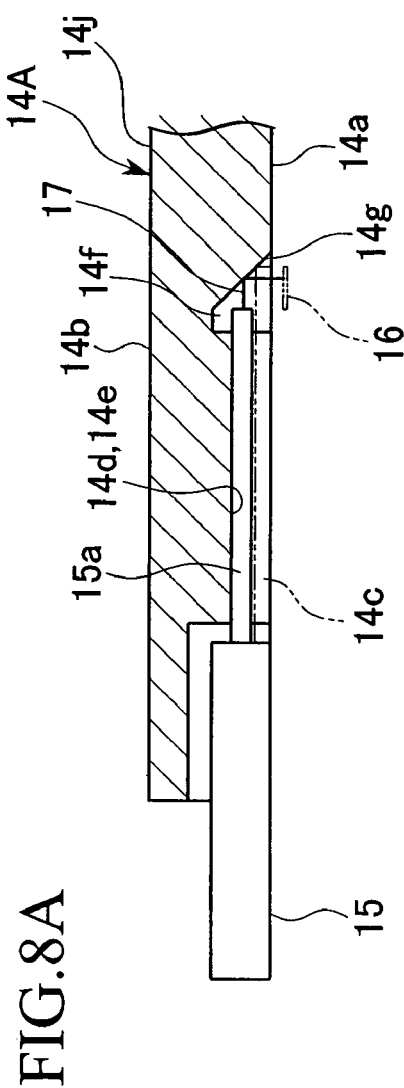
FIG.8A
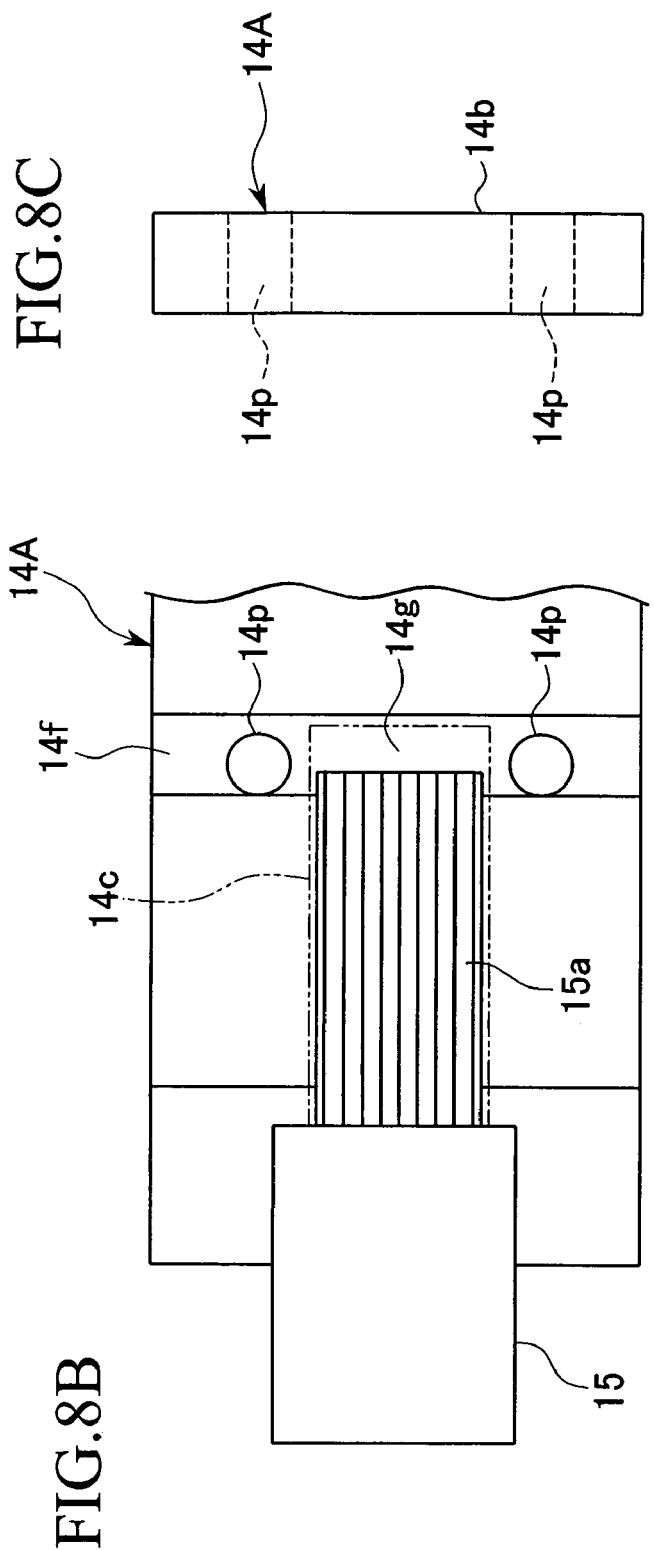
FIG.8B
FIG.8C

OPTICAL CONNECTOR ASSEMBLY, CONNECTOR HOLDER, AND OPTICAL CONNECTOR

CROSS-REFERENCE TO RELATED APPLICATION

This is a Continuation Application of International Application No. PCT/JP2004/006120, filed Apr. 28, 2004, which is based upon and claims the benefit of priority from Japanese Patent Application No. 2003-125350, filed Apr. 30, 2003. The contents of the aforementioned applications are incorporated herein in their entirety by reference.

BACKGROUND OF THE INVENTION

1. Field of the Invention

The invention relates to an optical connector assembly, a connector holder, and an optical connector having a fastening structure in which an optical connector provided at the distal end of an optical fiber can be mounted on an optical output-input terminal provided on a substrate and positioned at a position that enables an optical connection to the optical input-output terminal.

2. Description of Related Art

Presently, optical transceivers used in optical LAN systems or the like generally employ a configuration in which the optical axis of a light emitting element (such as a semi-conductor laser) or an optical chip module (such as a photodiode) is aligned with the direction of a circuit substrate, and an optical connector is attached to an end of the substrate on which these optical elements are mounted or of a lead frame to achieve connection with an external optical fiber. Examples of the ferrule for an optical connector used for such purpose are well-known single core optical ferrules (an MU ferrule (MU: Miniature-unit Coupling optical fiber connector, used in the optical connector stipulated in JIS C 5983), an SC-type ferrule (SC: single fiber coupling optical fiber, used in the optical connector stipulated by JIS C 5973), or the like) multi-core ferrules (MT ferrule (MT: Mechanically Transferable, stipulated in JIS C 5981), and so-called MINI-MT ferrules, and the like). The optical transceivers that employ any of these ferrules have already been standardized. However, accompanying the recent strengthening of requirements for optoelectric hybrid circuits and optoelectric mixed-signal substrates, because each type of optical transceiver having such a configuration has restrictions with respect to the installation position of the optical connector, problems are encountered in that the degree of freedom of the design of the optical connection paths and circuit substrates has become restricted, and furthermore, the substrate cannot be miniaturized. An example of an optical transceiver is disclosed in Japanese Unexamined Patent Application, First Publication No. H06-273641.

SUMMARY OF THE INVENTION

In consideration of the problems described above, an object of the invention is to provide an optical connector assembly, a connector holder, and an optical connector in which a structure for installing the optical connector on a substrate having optical elements mounted thereon can be miniaturized, the installation of the optical connector onto the substrate is easy, the degree of freedom of the design of the installation position is increased, and furthermore, the positioning of the optical connector with respect to the optical elements is easy and the precision of the positioning can be stably maintained over a long term.

In order to solve the aforementioned problems, the invention provides an optical connector assembly including: a substrate including a connection surface and an optical element; an optical connector, on a distal end of an optical fiber; and a positioning mechanism, that positions the optical fiber with respect to the optical element to provide an optical connection therebetween, the positioning mechanism including a positioning projection on one of the optical connector and the substrate and a corresponding positioning hole on the other of the optical connector and the substrate.

In the above optical connector assembly, the positioning projection or the positioning hole may extend in a direction different from an optical axis of the optical fiber at its distal end.

In the above optical connector assembly, the optical connector may include a light deflection portion arranged to deflect light passing between the optical element and the distal end of the optical fiber, to form the optical connection therebetween.

In the above optical connector assembly, an optical axis of the optical element may extend in a first direction; an optical axis of the optical fiber at its distal end may extend in a second direction different from the first; and the optical connector may change the direction of light exiting the optical fiber to the first direction or light exiting the optical element to the second direction.

The above optical connector assembly further includes a connector holder on the substrate, the connector holder may include a resilient member that urges and holds the optical connector against the substrate.

In the above optical connector assembly, the connector holder may include plural resilient members that urge and hold the optical connector against first region of the substrate between the plural resilient members.

In the optical connector assembly, the optical connector may include: a bottom surface facing the substrate; an upper portion opposite to the bottom surface; side portions between the upper portion and bottom surface; and a slant surface on a first one of the side portions, where the slant surface is inclined toward a second one of the side portions as the slant surface extends toward the upper portion; and the resilient member engages the slant surface so as to urge and hold the optical connector against the substrate.

In the optical connector assembly, the resilient member may include an arc-shaped connector abutting portion that contacts the slant surface in a line contact manner or a surface contact manner.

The optical connector assembly may further include a guide mechanism that includes a guide member projecting from one of the optical connector and the connector holder, and a corresponding positioning recess formed in the other of the optical connector and the connector holder, wherein insertion of the guide member into the corresponding positioning recess commences before insertion of the positioning projection into the positioning hole.

The optical connector assembly may further include holding portions provided on the substrate for holding the optical connector therebetween, where the optical connector is optically connected to the optical element while being held by the holding portions and when the positioning projection is inserted into the positioning hole.

In the optical connector assembly, the optical element may be an optical input-output terminal of the substrate.

In addition, the invention provides a connector, mounted on a substrate having an optical element, the connector holder including: a resilient member urging an optical connector against the connector holder and the substrate to provide an optical connection between the optical element and an optical fiber in the optical connector, wherein: the optical connector includes: a bottom surface facing the substrate; an upper portion opposite to the bottom surface; side portions between the upper portion and the bottom surface; and a slant surface on a first one of the side portions, the slant surface being inclined toward a second one of the side portions as the slant surface extends toward the upper portion; and the resilient member engages the slant surface to urge and hold the optical connector against the substrate.

The elastic members of the connector holder in the invention are structured such that the optical connector is urged against and held with respect to the optical input-output terminal by urging the urging slant surfaces of the optical connector. That is, the elastic members urge the optical connector by holding the optical connector at an angle against the optical input-output terminal. For example, in the case in which the upper portion of the optical connector, which is opposite to the bottom surface that faces the optical input-output terminal, is urged against the substrate by the elastic members, the elastic members must be disposed over the upper portion of the optical connector that is disposed on the optical input-output terminal. However, according to the invention, the optical connector may be urged against and held with respect to the optical input-output terminal by elastic members that abut the urging slant surfaces present at positions that avoid the upper portion of the optical connector. Thereby, it is possible to restrain the height that the mounting rises above the substrate. In addition, in a structure in which the urging slant surfaces of the optical connector are urged by the elastic members of the connector holder, a larger contact area between the elastic members and the optical connector can be easily secured, and thereby, there is an advantage in that it is possible to avoid local stress concentrations in the optical connector due to the urging force from the elastic members.

In addition, in the invention, as a portion that abuts the optical connector, the elastic members may employ a structure that has a connector abutting portion in the form of arc-shaped plate that line contacts or surface contacts the urging slant surface. In this structure, the portion of the elastic members abutting the optical connector has the form of an arc-shaped plate that line contacts or surface contacts the optical connector. Thus, compared to the case in which, for example, the elastic members urge the optical connector by a portion having a spherical shape, it is possible to avoid the occurrence of local stress concentrations in the optical connector due to the urging force applied to the optical connector by the elastic members, and thereby it is possible to realize stable support of the optical connector and damage prevention.

The above connector holder may further include plural resilient members that urge and hold the optical connector against a first region of the substrate between the plural resilient members.

In the connector holder, the resilient member may include an arc-shaped connector abutting portion that contacts the slant surface in a line contact manner or a surface contact manner.

The connector holder may also include a guide member projecting from the connector holder, the guide member being adapted to be inserted into a positioning recess in the optical connector, wherein, when the optical connector is urged against the substrate by the resilient member, the optical connector is positioned by the guide member to enable the optical connection between the optical fiber and the optical element.

The above connector holder may also include an attachment portion attaching the connector holder to the substrate.

In the above connector holder, the optical element may be an optical input-output terminal of the substrate.

According to the structure described above, the optical connector can be held by the elastic members of the connector holding portion simply by inserting the optical connector, whose positioning recess accommodates the guide member inserted therein, into the connector holding portion by moving the optical connector along the guide member. Furthermore, because the guide member functions as a positioning member for the optical connector, if the engaging precision between the guide member and the positioning recess is set sufficiently high, the optical connector held in the connector holding portion is positioned at a position that enables the optical connection between the optical fiber and the optical input-output terminal. Thereby, the positioning of the optical connector with respect to the optical input-output terminal can be realized extremely easily. Furthermore, there is an advantage in that even after the optical connector is held in the connector holding portion, the positioning state of the optical connector with respect to the optical input-output terminal is stably maintained by the guide member.

Furthermore, when employing a structure in which the optical connector that has been pressed into the connector holder is positioned with respect to the substrate by the pin-engaging positioning device that uses positioning pins and is disposed at a position that enables the optical connection to the optical input-output terminal, there are the advantages that at the connector holding portion, the optical connector is stably positioned and held by the pin-engaging positioning device, the guide member, and the elastic members. Thereby, the optical connection state between the optical connector (optical fiber) and the optical input-output terminal can be stably maintained over a long term. In particular, in addition to the guide member, the pin-engaging positioning device functions as a positioning member for the optical connector with respect to the optical input-output device, and thereby there are the advantages in that high precision positioning is possible and that the positioning accuracy can be stably maintained over a long term.

Furthermore, in the invention, the optical connector may employ a structure in which an optical fiber that is disposed across the optical axis of the end of an optical input-output terminal and an optical input-output terminal are optically connected. In this case, an optical fiber extends in a direction transverse to the direction in which the optical connector is pressed towards the optical input-output terminal, that is, the direction in which the optical connector is pressed towards the connector holder. This optical fiber is connected to the optical input-output terminal via an optical connector. The optical fiber extending from the optical connector and connected to the optical input-output terminal with an optical axis laid at an angle with respect to the substrate can be easily laid along the substrate. As a result, it is possible to prevent the height of the mounting of the optical connector and the connector holder above the substrate from becoming substantially high because of the space required for laying the optical fiber. In addition, the optical connector itself may have, for example, a flat shape conforming to the optical fiber, and thereby a reduction in the height of the mounting with respect to the substrate may be easily realized.

In addition, the invention provides an optical connector for optically connecting an optical fiber to an optical element on a substrate, comprising: a connector body at a distal end of the optical fiber; and a positioning feature, that positions the optical fiber with respect to the optical element to provide an optical connection therebetween, the positioning feature comprising a positioning projection or a positioning hole on the connector body, which interface with a corresponding positioning hole or positioning projection, respectively, on the substrate.

In the above optical connector, the positioning projection or the positioning hole may extend in a direction different from an optical axis of the optical fiber at its distal end.

In the above optical connector, a light deflection portion may be arranged to deflect light passing between the optical element and the distal end of the optical fiber, to form the optical connection therebetween.

In the above optical connector, an optical axis of the optical element may extend in a first direction; an optical axis of the optical fiber at its distal end may extend in a second direction different from the first; and the optical connector may change the direction of light exiting the optical fiber to the first direction or light exiting the optical element to the second direction.

The optical connector may include a glass plate fixed to the connector body, wherein the optical fiber is interposed between the connector body and glass plate.

In the above optical connector, the glass plate may form a portion of a bottom surface, facing the substrate, of the connector body.

In the above optical connector, the connector body may include a positioning groove formed on the connector body, that positions the optical fiber interposed between the connector body and glass plate In the above optical connector, the connector body may include: a bottom surface facing the substrate; an upper portion opposite the bottom surface; side portions between the upper portion and bottom surface; and a slant surface on a first one of the side portions, the slant surface being inclined toward a second one of the side portions as the slant surface extends toward the upper portion; the substrate includes a connector holder having a resilient member that urges and holds the connector body against the optical element; and the resilient member engages the slant surface so as to urge and hold the connector holder against the substrate.

In the above optical connector, the connector body may include plural slant surfaces.

In the above optical connector, the connector body may further include a lower slant surface formed on the first one of the side portions, where the lower slant surface is inclined toward the second one of the side portions as the lower slant surface extends toward the bottom surface, and the lower slant surfaces push out the resilient member when the connector body is pressed toward substrate.

In the above optical connector, the optical element may be an optical input-output terminal of the substrate.

The optical connector according to the invention can be applied to the optical connector assembly and connector holder according to the invention. In particular, in the case in which the optical connector employs a structure having positioning pins or pin-engaging holes, the optical fiber can be easily positioned with respect to the optical input-output terminal by engaging the positioning pins. The positioning pins and the pin-engaging holes form a pin-engaging positioning device of a fastening member that fastens the optical input-output terminal. Thereby, improvement of the positioning accuracy and stable maintaining of the positioning accuracy over a long term can be easily realized.

Note that, herein, an optical input-output terminal denotes, for example, an optical element that is a light emitting element or a light receiving element (more particularly, a light emitting surface of a light emitting element or a light receiving surface of a light receiving element), a distal end of an optical fiber, an optical ferrule and various types of optical connectors (more particularly, a coupling end for aligning and coupling). An optical input-output terminal is a generic term for an element that at least functions either to output light (including light emission) or input light (including light reception). In addition, a fastening member that fastens the optical input-output terminal includes fastening parts such as a mount on which the optical element is mounted, the substrate to which the mount is fastened, an optical connector that terminates to enable a connection between the optical fiber and the connector, the holder that fastens the optical connector, or the like.

According to the invention, it is possible to carry out the connecting of the optical connector to the optical input-output terminal extremely easily, and furthermore, by using a structure in which urging slant surfaces formed in the optical connector at an angle to the bottom surface thereof are urged against the optical input-output terminal by the elastic members of the connector holder to urge and hold the optical connector against the optical input-output terminal, it is possible to reduce the height of the mount of the optical connector above the substrate. Thereby, for example, it is possible to realize a reduction of the storage space of the substrate in the device that accommodates the substrate, a down-sizing of such a device, and a reduction (high density) of the arrangement pitch when a plurality of substrates are laminated and disposed.

In addition, the operation in which an optical fiber that is angled with respect to the optical axis of an optical input-output terminal is optically connected to the optical input-output terminal is easily carried out by using an optical connector having a configuration in which the optical input-output terminal and the optical fiber are optically connected by forming a curved light path that optically connects the optical input-output terminal and the optical fiber at an angle with respect to the optical axis of the optical input-output terminal by using a mirror that is incorporated into the connector body. There are the advantages that the connection with the optical fiber can be realized simply by positioning a down-sizable optical connector on the optical input-output terminal, and thereby the height of the mount of the optical connector above the substrate can be reduced. Furthermore, by forming a pin-engaging positioning device on the fastening member that fastens the optical input-output terminal by using positioning pins or pin-engaging holes of the optical connector, there are the advantages that it is possible to realize an improvement in the positioning accuracy of the optical connector (more particularly, the optical fiber fastened in the optical connector) with respect to the optical input-output terminal and an improvement of the positioning operability. Further, it is possible to secure easily the long-term stability of the positioning accuracy.

BRIEF DESCRIPTION OF THE DRAWINGS

The above and other objects, features and advantages of the invention will become more apparent by describing in detail exemplary embodiments thereof with reference to the attached drawings in which:

FIGS. 5A through 5C are drawings schematically showing the optical connector installed in the connector holder shown in FIG. 1, where 5A is a frontal cross-section, 5B is a bottom view shown from the coupling surface side that is coupled with the upper surface of the photoelectric conversion module, and FIG. 5C is a side view;

FIG. 6 is a side view of the optical connector shown in FIGS. 5A to 5C;

FIG. 7A is a front view (partial cross-sectional drawing) and FIG. 7B is a side view; and FIGS. 8A to 8C are drawings schematically showing the structure of the optical connector having pin engagement holes formed instead of the positioning pins of the optical connector shown in FIGS. 5A to 5C, where FIG. 8A is a front cross-sectional view, FIG. 8B is a bottom view shown from the coupling surface that couples to the upper surface of the photoelectric conversion module 12, and FIG. 8C is a side view.

DETAILED DESCRIPTION OF THE INVENTION

Exemplary embodiments of the invention will now be explained with reference to the drawings. The described exemplary embodiments are intended to assist the understanding of the invention, and are not intended to limit the scope of the invention in any way. For example, the elements of these embodiments can be appropriately combined together.

Figure 1:
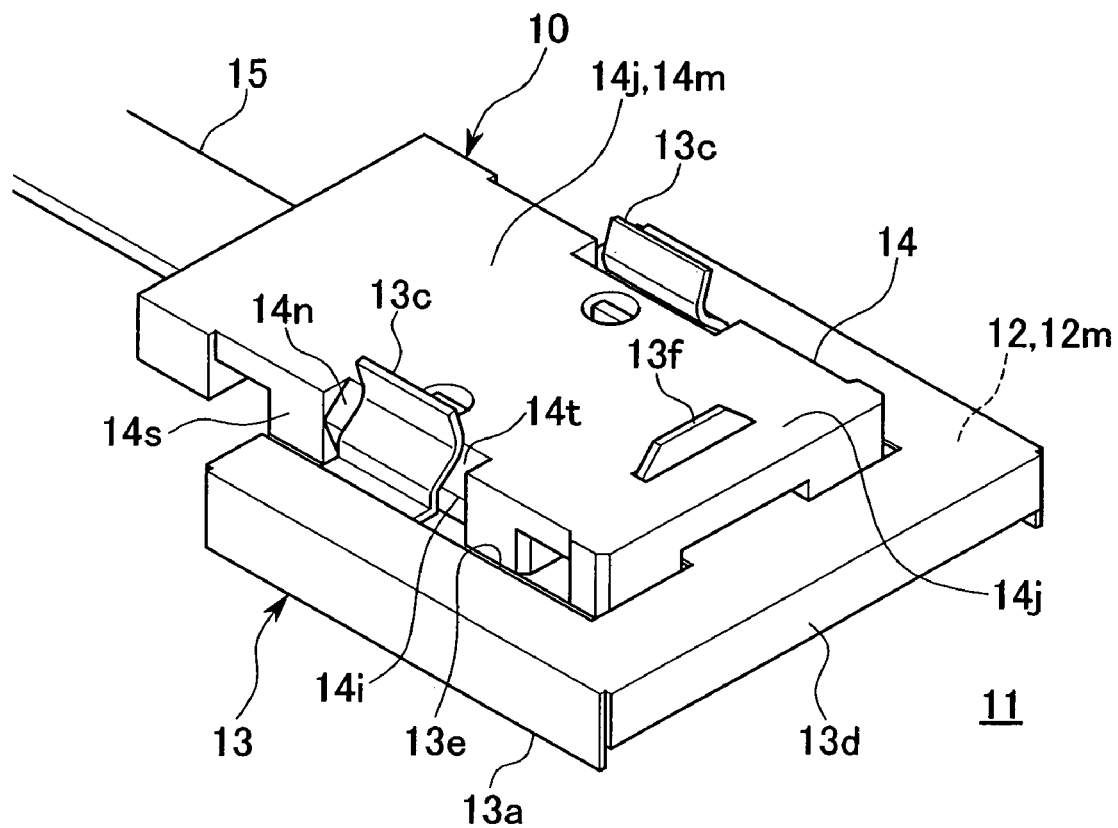
FIG. 1 is a drawing showing an optical connector assembly and a connector holder according to the invention, and is a general perspective drawing showing the state in which the optical connector is fastened in the connector holder.
Figure 2:
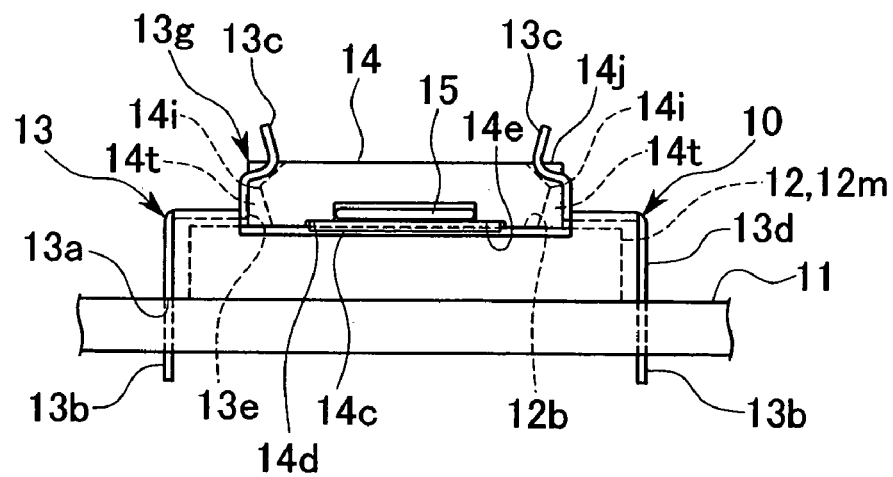
FIG. 2 is a side view showing the connector holder and the optical connector shown in FIG. 1 from the side from which the optical fiber is withdrawn.
Figure 3:
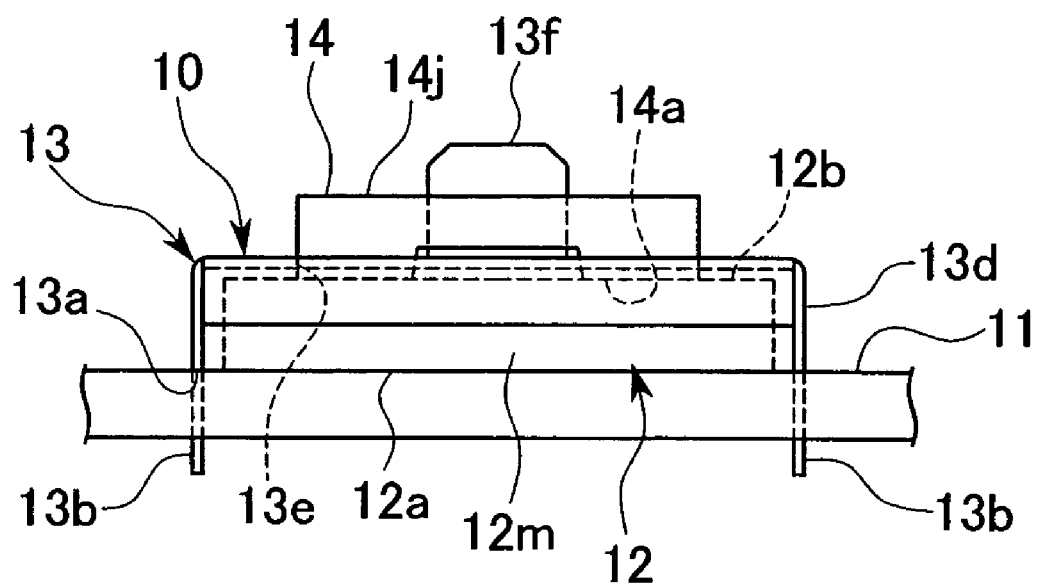
FIG. 3 is a side view showing the connector holder and optical connector shown in FIG. 1 from the side opposite to that in FIG. 2.
Figure 4A:
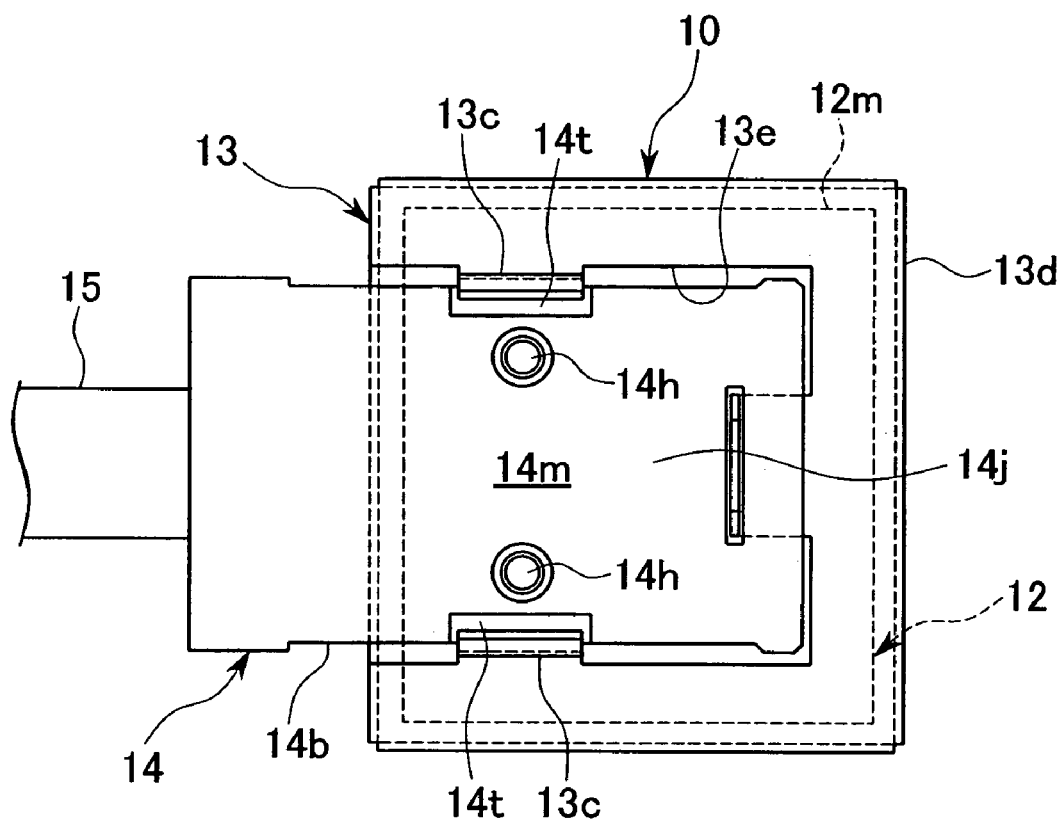
FIG. 4A is a planar view of the connector holder and optical connector shown in FIG. 1.
Figure 4B:
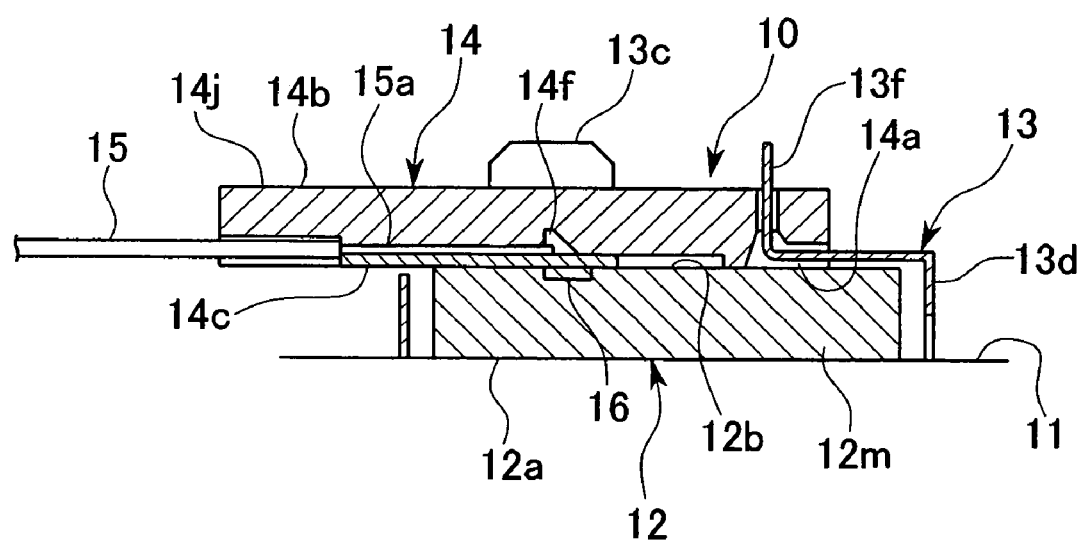
FIG. 4B is a cross-sectional view of the same.

FIG. 1 to FIG. 4B are drawings showing the optical connector assembly (denoted by reference numeral 10, and may also be referred to as the optical connector fastening structure). FIG. 1 is a general perspective view, FIG. 2 is a side view (a side view seen from the side in which the optical fiber 15 extends), FIG. 3 is a side view from the side opposite to that shown in FIG. 2, FIG. 4A is a plan view, and FIG. 4B is a front cross-sectional view.

In FIG. 1 to FIG. 4B, reference numeral 11 denotes a circuit substrate, 12 denotes a photoelectric conversion module, 13 denotes a connector holder, 14 denotes an optical connector, and 15 denotes an optical fiber.

The photoelectric conversion module 12 is a chip-shaped or array-shaped module having light elements such as a light emitting element, for example, a semiconductor laser (for example, a laser diode (LD)) and a light receiving element such as a photodiode (PD) on-board (or built in). The optical axis (light receiving surface) of the optical element of the photoelectric conversion module 12 is oriented perpendicular to the circuit substrate 11. The photoelectric conversion module 12 is electrically connected to the circuits and the like of the circuit substrate 11. In FIG. 4A, 4B, and the like, an example of a structure is shown in which the optical element 16 of the photoelectric conversion module 12 is formed on the surface (below, referred to as the coupling surface 12b) opposite to the bottom surface 12a of the photoelectric conversion module 12 that faces the circuit substrate 11. In addition, the coupling surface 12b extends in the direction along the circuit substrate 11. Note that although not specifically shown, photoelectric conversion circuits, control processing portions, optical signal processing circuits, optical element driving circuits, and various circuits that drive and control the electrical components on the circuit substrate are formed on the circuit substrate on which the photoelectric conversion module is mounted.

In this embodiment, an optical element 16 (more specifically, the light emitting surface or the light receiving surface of the optical element 16) functions as an optical input-output terminal, and below, disclosures of an optical element may also be understood to denote an optical input-output terminal. In addition, the light emitting surface or the light receiving surface of the optical element 16 functions as the terminal surface of an optical input-output terminal, and below, disclosures of light emitting surfaces or light receiving surfaces may also be understood to denote the terminal surfaces of optical input-output terminal.

In this embodiment, the optical connector assembly 10 is formed having a photoelectric conversion module 12 that is mounted on the circuit substrate 11 and a frame-shaped connector holder 13 that is disposed so as to be fastened to the circuit substrate 11 and surround the photoelectric conversion module 12 on the outside. The connector holder 13 positions and holds the optical connector 14 provided on the distal end of the optical fiber 15 on the photoelectric conversion module 12, and functions to urge the optical connector 14 so as not to be misaligned with respect to the photoelectric conversion module 12. The mount 12m of the photoelectric conversion module 12 and the circuit substrate 11 function as a fastening member.

Specifically, the connector holder 13 is a metal plate made, for example, of stainless steel that has been shaped by bending, and the connector holder 13 is mounted on the circuit substrate 11 and fastened to the circuit substrate 11 so as not to jiggle by fastening the fastening members 13b that project from a plurality of positions on the abutting portion 13a (the lower end portion of the frame-shaped body 13d provided along the peripheral portion of the photoelectric conversion module 12) to the circuit substrate 11 on the back side (the bottom side surface in FIG. 2 and FIG. 3) thereof by passing through the circuit substrate 11.

FIGS. 5A to 5C are drawings schematically showing the structure of the optical connector 14. FIG. 5A is a frontal cross-sectional drawing; FIG. 5B is a bottom view seen from the coupling surface 14a (bottom surface) side coupled to the upper surface 12b of the photoelectric conversion module 12; and FIG. 5C is a side view. In addition, FIG. 6 is a side view of the optical connector 14. The coupling surface 14a forms the bottom surface that faces the upper surface of the optical element 16 of the photoelectric conversion module 12, and below, there are cases in which the bottom surface may be explained as being a "coupling surface".

The optical connector 14 has a connector body 14b made of a synthetic resin such as plastic and a glass plate 14c that is fastened so as to adhere to the connector body 14b. The optical fibers 15a are fastened by being interposed between the connector body 14b and the glass plate 14c. The glass plate 14c is exposed at the coupling surface 14a of the optical connector 14, and when the optical connector 14 is placed over and aligned with the photoelectric conversion module 12, the glass plate 14c is disposed facing the upper surface 12b of the photoelectric conversion module 12. In addition, the optical connector 14 is formed having a blockshaped external appearance and having a size substantially identical to or slightly smaller than that of the photoelectric conversion module 12. Even when installed on the photoelectric conversion module 12, there is no significant projection from the photoelectric conversion module 12 to the outside.

Note that in the optical connector, instead of a glass plate, a translucent plate or a translucent body formed by a material other than a glass plate, such as a plastic, may be used.

In brief, the optical connector may include a translucent material formed by a material in which the occurrence of optical attenuation or loss is not a problem at least in a practical wavelength band.

The optical fibers 15*a* interposed between the connector body 14*b* and the glass plate 14*c* of the optical connector 14 are positioned and held with precision by the positioning grooves 14*d* formed in the connector body 14*b*.

Here, optical fibers 15*a* are single optical fibers (here, bare fibers) that exit from the distal end of the optical fiber 15, which is a multiple core optical fiber tape cable. Between the connector body 14*b* and the glass plate 14*c* of the optical connector 14 a plurality of optical fibers 15*a*, which exit from the distal end of the optical fiber 15, is arranged in parallel by positioning grooves 14*d* formed in the surface on which the glass plate 14*c* of the connector body 14*b* of the optical connector 14 is installed. Thereby, each of the optical fibers 15*a* can be positioned with precision. Like the present embodiment, in the case in which the optical fiber 15 has 12 optical fibers 15*a*, each of the four optical fibers 15*a* on the left and right sides may be active fibers, and the central four optical fibers 15*a* may be dummy fibers. This is for preventing interference between the optical fibers.

Although the positioning grooves 14*d* are shown above as having a V-shaped cross-section, they are not so limited, and the positioning grooves 14*d* may also be round grooves (grooves having a semi-circular cross-section), U-shaped grooves, or the like. In addition, the structure in which the positioning grooves are formed on the connector body 14*b* of the optical connector 14 is not so limited, and a structure in which the positioning grooves are formed on the glass plate 14*c* and a structure in which the positioning grooves are formed on both the body of the optical connector and the glass plate may be used.

In addition, a multicore optical fiber cable is shown above as the optical fiber 15, but is not so limited. For example, other types of structure such as a single core optical fiber cable may be used. The structure in which the entire length of optical fibers 15*a* is shown above as a bare fiber, but is not so limited. For example, other types of structures, such as optical fiber lines and bare fibers arrayed in order from the end of the tape, may be used. Bare optical fiber is exposed at least at the distal end, and the bare optical fiber is positioned with high precision by the positioning grooves 14*d*. Furthermore, it is possible to use, for example, a GI type (GI: graded index) silica glass optical fiber as the optical fiber (specifically, the bare optical fiber) used in the optical connector 14, but this is not limiting.

The optical fibers 15*a* are inserted into the hollow recess 14*f* from the surface 14*e* on which the glass plate 14*c* of the connector body 14*b* of the optical connector 14 is installed. A reflecting portion 14*g* is formed in the recess 14*f*. The reflecting portion 14*g* is formed by a metallic vapor deposition film, or the like, on the inner wall surface that faces the distal ends of the optical fibers 15*a*, and positioned in an extension of the optical axis of the distal end of the optical fibers 15*a* that are inserted into the recess 14*f* and separated by a slight clearance. The reflecting portion 14*g* forms a reflecting surface at an angle of 45° with respect to the extended line of the optical axis of the distal end of the optical fibers (specifically, the bare optical fibers) and is positioned exactly on the optical element 16 of the photoelectric conversion module 12 when the optical connector 14 is installed on the photoelectric conversion module 12. The reflecting portion 14*g* faces the light emitting surface and the light receiving surface of the optical element 16 and irradiates the light emitted from the distal end of the optical fibers 15*a* on the optical element 16 after being deflected 90°. Thereby, the reflecting portion 14*g* functions as a mirror (light deflection portion) that makes the light emitted from an optical element 16 incident on the optical fibers 15*a* after being deflected 90°. That is, the reflecting portion 14*g* functions as a mirror that forms the light path 17 between the optical fibers 15*a* and an optical element 16.

In the light path 17, the portion positioned between the reflecting portion 14*g* and the optical element 16 is the light path connecting the optical connector 14 and the optical element 16, and is angled (in this embodiment, the direction substantially perpendicular) with respect to the circuit substrate 11. Thereby, the optical element 16 and the optical fiber 15 are optically connected on an optical axis that is angled with respect to the circuit substrate 11. Here, the expression "the optical axis is angled with respect to the circuit substrate 11" means that the optical axis intersects the horizontal plane thereof in the case in which the circuit substrate 11 extends substantially in the horizontal plane. In addition, the expression "optically connected" means that the optical members are disposed at positions that enable optical signal transmission between each other.

The optical connector 14 functions to optically connect the optical fiber 15 to the optical element 16, where the optical fiber 15 extends in the direction that intersects with the optical axis of the light path that connects the optical connector 14 and the optical element 16.

Note that the reflecting portion that functions as a mirror is described above as a reflecting film formed by a metallic vapor deposition film, but is not so limited. For example, any type of structure in which a chip with a film formed thereon is housed in the recess 14*f* may be used.

In addition, the reflecting portion 14*g* is not limited to having a reflecting surface that is angled 45° with respect to the extended line of the optical axis of the distal end of an optical fiber (specifically, a bare optical fiber). The reflecting portion 14*g* may form a light path that is deflected between the distal end of the optical fiber 15 fastened by the optical connector 15 and the optical elements 16, and thereby enable an optical connection between the optical fiber 15, which extends in the direction that intersects the optical axis of the light path that connects the optical connector 14, and the optical element 16. The angle of inclination of the reflecting surface with respect to the extended line of the optical axis of the distal end of the optical fiber (specifically, the bare optical fiber) is not particularly limited.

The coupling surface 14*a* side of the recess 14*f* is sealed by the glass plate 14*c*, and after the optical fibers 15*a* have been fastened, it is possible to prevent inconveniences such as contamination due to the penetration of dust and the like and increases in loss due to the scattering of light passing through the light path 17 and the like.

In addition, the light passing through the light path 17 between the optical fibers 15*a* and the upper surface of the optical element 16, and in particular, the light passing between the reflecting portion 14*g* and the upper surface of the optical element 16, passes through the glass plate 14*c*.

For example, the glass plate 14c has optical characteristics that enable transmission of the light through the light path 17 with almost no occurrence of loss due to scattering or the like.

As necessary, the recess 14f may be filled with an optical adhesive. The optical adhesive may be formed by a material that causes practically no problems such as optical attenuation or loss at least in a practical wavelength band. In addition, the adhesive may be applied at the same time as the bonding of the glass plate 14c.

According to the invention, the optical connector 14 is disposed on the photoelectric conversion module 12 and held by the connector holder 13. Thereby, it is possible to realize an optical connection between an optical element 16 and the light path of the optical fiber 15 (the light paths formed by each of the optical fibers 15a).

In addition, the optical connector 14 that has been disposed on the photoelectric conversion module 12 is held by the photoelectric conversion module 12 due to the structure of the connector holder 13, and stably held so as not to become misaligned with respect to the photoelectric conversion module 12.

Specifically, as shown in FIG. 2 and the like, the connector holder 13 includes a pair of flat spring-shaped urging members 13c for urging the optical connector 14 against the photoelectric conversion module 12 and a guide member 13f that guides the optical connector 14 so as enable insertion of the positioning pins 14h described below into the pin holes 12c. These urging members 13c and the guide member 13f are both projecting members that project so as to rise above the connector holder 13 (specifically, the frame body 13d). The plurality of urging members 13c form the connector holding portion 13g that engages with and releasably holds the optical connector 14 disposed on the upper surface of the optical element 16. Due to pressing the optical connector 14 towards the photoelectric conversion module upper surface 12b by moving the optical connector 14 in a direction perpendicular to the photoelectric conversion module upper surface 12b on the connector holder 13g, it is possible to press the optical connector 14 between the plurality of urging members 13c. Thereby, the optical connector 14 is held by the plurality of urging members 13c of the connector holding portion 13g.

The urging members 13c are small curved tongue-shaped members that project from the frame body 13d of the connector holder 13. These urging members 13c are formed so as to rise from the frame body 13d, the projecting center portion (the connector abutting portion 13h) projecting from the frame body 13d of the urging member 13c projects such that the curved outer surface side slightly projects towards the center opening 13e of the frame body 13d, and the distal end projecting from the frame body 13d is curved so as to turn back towards the outside of the center opening 13e. These urging members 13c hold the optical connector 14 disposed on the connector holder 13g, and at the same time, functions as elastic members that urge the optical connector 14 against the optical element 16 of the photoelectric conversion module 12.

The guide member 13f is inserted into a hole-shaped positioning recess 14k (refer to FIG. 7A) that is bored through the optical connector 14 from the bottom surface (coupling surface 14a) of the optical connector 14 that faces the upper surface of the optical element 16 to the upper surface 14j opposite to the bottom surface 14a. The guide mechanism is formed by the guide member 13f and the positioning recess 14k.

Figure 7A:
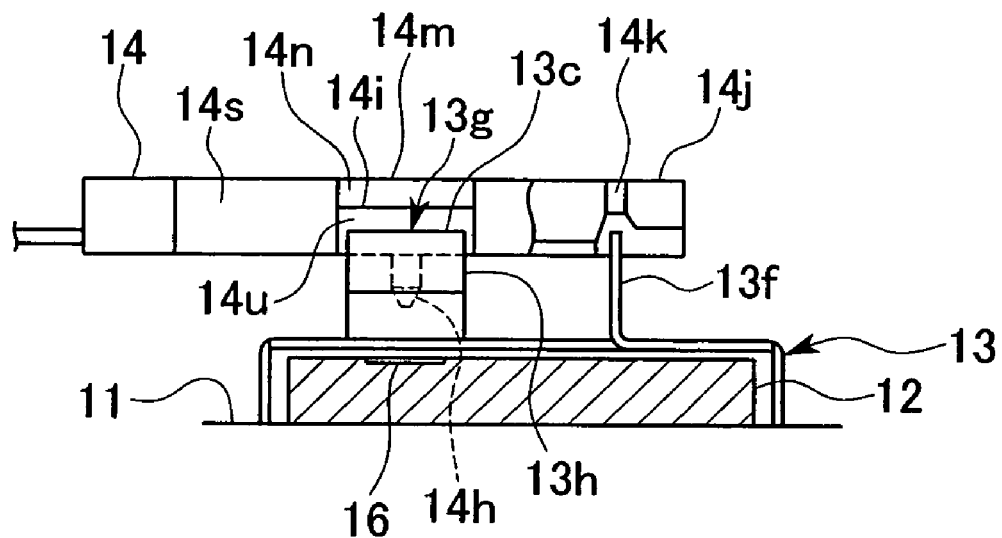
FIGS. 7A and 7B are drawings showing the structure in proximity to the connector holding portion of the connector holder, where
Figure 7B:
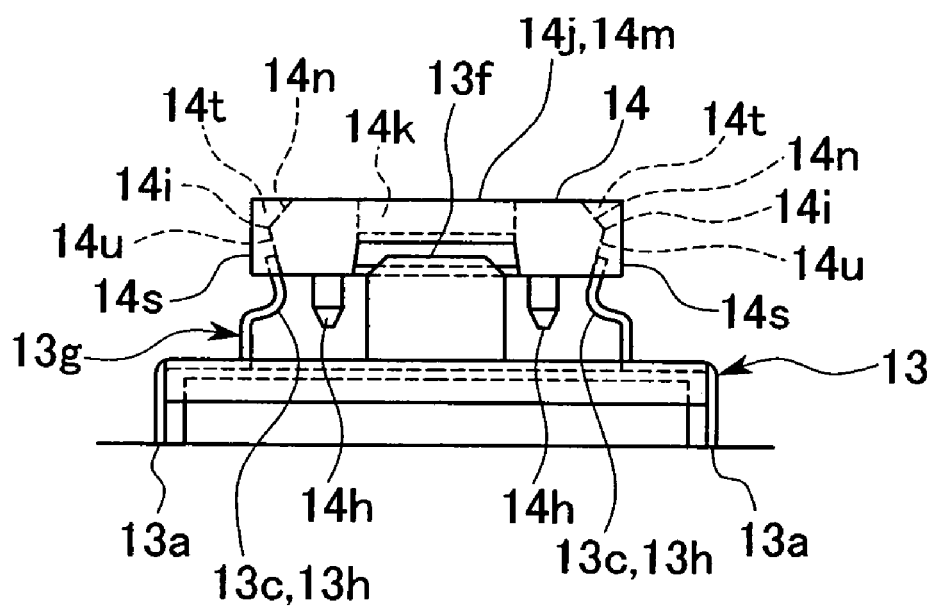

As shown in FIG. 7A and FIG. 7B, to hold the optical connector 14 in the connector holding portion 13g, the guide member 13f is inserted into the positioning recess 14k with the coupling surface 14a facing the photoelectric conversion module 12, and thereby the optical connector 14 may be pressed into the photoelectric conversion module 12 along the guide member 13f. When the optical connector 14 is pressed between the pair of urging members 13c due to the movement along the guide member 13f, the grooves 14t formed in both opposing sides 14s of the optical connector 14 are positioned by these urging members 13c, and the urging members 13c are inserted into each of the grooves 14t. At this time, the guide member 13f functions to position the urging members 13c with respect to the grooves 14t.

In the groove 14t, slant surfaces 14u are formed that cut gradually into the connector body 14b of the optical connector 14 from both sides 14s of the optical connector 14 towards the bottom surface (the coupling surface 14a) from the center portion to the bottom side in the vertical direction of the optical connector 14 (the vertical direction is defined as the coupling surface 14a side being below and the upper surface 14j being above; that is, the vertical direction in FIGS. 7A and 7B). Furthermore, from the center portion to the upper side of the optical connector 14 in the vertical direction, urging slant surfaces 14n are formed that extend so as to rise up from both side portions 14s of the optical connector 14 towards the upper portion 14m (more exactly, in this embodiment, towards the center portion of the upper portion 14m) positioned opposite to the bottom surface (coupling surface 14a) of the optical connector 14 that faces the upper surface of the optical element 16. Thus, when the optical connector 14 is continuously pressed towards the photoelectric conversion module 12, the pair of urging members 13c that have been inserted in the grooves 14t on both sides of the optical connector 14 are spread apart by the slant surfaces 14u. In addition, when the interface between the slant surfaces 14u and urging slant surfaces 14n, that is, the portion of the optical connector 14 (projecting portion 14i) where the grooves 14t on both sides are most shallow, passes to the side of the photoelectric conversion module 12 such that portions of the urging members 13c on both sides that are closest to each other (the abutting portion 13h) are spread apart, the urging members 13c are engaged in the urging slant surfaces 14n. The urging slant surfaces 14n are urged towards the upper surface 12b of the photoelectric conversion module 12 due to the elasticity of the urging members 13c themselves. Thereby, the optical connector 14 is interposed between both urging members 13c and the photoelectric conversion module 12 so as to be pressed into the photoelectric conversion module 12.

In other words, the slant surfaces 14u may be surfaces that are formed as portions of the side surfaces of the optical connector 14 (the surface outside the coupling surface 14a) angled with respect to the coupling surface 14a. However, the slant surfaces 14u are not limited to a structure in which the slant surfaces 14u are formed as side surfaces of the upper portion 14m formed at positions opposite to the coupling surface 14a of the optical connector 14. For example, a structure may be used in which the slant surfaces 14u are formed in recesses that are hollow from the side portions 14s of the optical connector 14.

In addition, high precision positioning of the optical connector 14 with respect to the photoelectric conversion module 12 (specifically, the optical element 16) can be assured by inserting and engaging the positioning pins 14h that project perpendicularly from the coupling surface 14a into the pin holes 12C (pin-engaging holes) that open in the upper surface 12b of the photoelectric conversion module 12. The guide member 13f also contributes to assuring high precision positioning of the optical connector 14 with respect to the photoelectric conversion module 12 (specifically, the optical element 16). It is also possible to use positioning pins 14h that are made, for example, of a metal such as stainless steel, but of course, the material is not limited, and various types of material may be used.

In addition, in the present embodiment, the positioning pins 14h were shaped in the form of round rods. A thin plate shape may also be used. In this case, naturally the pin holes 12c will also have a shape conforming thereto. With any of these shapes, both the positioning pins 14h and the pin holes 12c allow precision positioning during engagement. In the present embodiment, the positioning pins 14h extend in a direction identical to that of the optical axis of the optical element 16 and perpendicular to the coupling surface 14a. However, the direction of the extension of the positioning pins 14h is not so limited. The direction may be different from the optical axis of the optical element 16, and in addition, the angle may be other than 90° with respect to the coupling surface 14a. However, from the viewpoint of the positioning accuracy for realizing the optical connection, like the present embodiment, the positioning pins 14h extend in a direction identical to that of the optical axis of the optical element 16 and perpendicular to the coupling surface 14a, and the optical connector 14 is pressed along the direction of the optical axis.

The positioning pins 14h are disposed in opposition on the portion positioned within the light path 17 between the distal end of the optical fiber 15 fastened in the connector body 14b and the mirror (reflecting portion 14g), or on both sides via an extended imaginary line thereof. In addition, in the optical connector 14, the mirror is disposed between the pair of positioning pins 14h that project on the coupling surface 14a of the optical connector 14. In addition, in the optical connector 14, within the light path 17, the portion positioned between the distal end of the optical fiber fastened in the connector body 14b and the mirror (the reflecting portion 14g) is positioned between the pair of positioning pins 14h. Furthermore, the portion of the light path 17 extends perpendicular to the imaginary line that connects the pair of positioning pins 14h (the imaginary line 14w shown in FIG. 5B, that is, the imaginary line that passes through the central axis of each of the positioning pins 14h). In addition, in the optical connector 14, the positioning grooves 14d that position the distal end of the optical fiber 15 (specifically, the optical fibers 15a) are positioned between a pair of positioning pins 14h, and furthermore, the extended direction of the positioning grooves 14d is the direction perpendicular to the imaginary line 14w that connects the pair of positioning pins 14h.

The positioning pins, which are fixed to the optical connector, and the photoelectric conversion module, in which the pin-engaging holes into which these positioning pins are inserted and engaged are formed, function together as a pin-engaging positioning mechanism that positions the optical connector at a position that enables the optical connection to the optical elements on the circuit substrate. Note that in this embodiment, a configuration in which the engaging pins (positioning pins) that project from the optical connector side are inserted and engaged with the pin holes of the photoelectric conversion module is shown as an example. However, the positions at which the pin-engaging holes are formed need not necessarily be in the photoelectric conversion module. The positions may be outside the photoelectric conversion module, for example, in a member fastened to the circuit substrate or the circuit substrate itself. In addition, it is also possible to use a configuration in which a member that is fastened to the circuit substrate (for example, the photoelectric conversion module described above) and the projecting engaging pins that are fastened to the circuit substrate are inserted and engaged in the pin-engaging holes (an example of the optical connector 14A having pin-engaging holes formed therein is shown in FIGS. 8A to 8C) formed in an optical connector. Note that the optical connector 14A shown as an example in FIGS. 8A to 8C eliminates the positioning pins 14h of the optical connector 14, and has pin-engaging holes 14p that open on the coupling surface 4a bored therein. The positions at which the pin-engaging holes 14p are formed are identical to the positions at which the positioning pins 14h project on the coupling surface 14a.

As described above, during the operation in which the optical connector 14 is pressed into the connector holding portion 13g and held by the urging members 13c of the connector holding portion 13g, first the guide member 13f is inserted into the positioning recess 14k of the optical connector 14, and then the connector holding portion 13g is pressed so that misalignment of the optical connector 14 is restricted by the guide member 13f and held by the urging members 13c of the connector holding portion 13g. Thereby, there are the advantages that positioning and engaging of the urging members 13c with respect to the urging slant surfaces 14n and the positioning of the optical connector 14 with respect to the optical element 16 are carried out easily and efficiently. Under the condition in which the optical connector 14 is in contact with the urging members 13c and the elastic force of the urging members 13c is acting on the optical connector 14, the pressing of the optical connector 14 into the connector holding portion 13g by the guide members 13f is carried out smoothly, and the positioning of the optical connector 14 with respect to the optical element 16 also can be carried out easily.

The optical connector assembly according to the invention is structured so that the optical connector 14 abuts the urging slant surfaces 14n and the optical connector 14 is held against the optical element 16 by the urging members 13c of the connector holder 13. Thus, when the optical connector 14 is urged by the urging members 13c, because the portion of the urging members 13c that projects above the optical connector 14 is very small or the projection of the urging members 13c above the optical connector 14 can be eliminated, the as an example in FIGS. 8A to 8C eliminates the positioning pins 14h of the optical connector 14, and has pin-engaging holes 14p that open on the coupling surface 4a bored therein. The positions at which the pin-engaging holes 14p are formed are identical to the positions at which the positioning pins 14h project on the coupling surface 14a.

As described above, during the operation in which the optical connector 14 is pressed into the connector holding portion 13g and held by the urging members 13c of the connector holding portion 13g, first the guide member 13f is inserted into the positioning recess 14k of the optical connector 14, and then the connector holding portion 13g is pressed so that misalignment of the optical connector 14 is restricted by the guide member 13f and held by the urging members 13c of the connector holding portion 13g. Thereby, there are the advantages that positioning and engaging of the urging members 13c with respect to the urging slant surfaces 14n and the positioning of the optical connector 14 with respect to the optical element 16 are carried out easily and efficiently. Under the condition in which the optical connector 14 is in contact with the urging members 13c and the elastic force of the urging members 13c is acting on the optical connector 14, the pressing of the optical connector 14 into the connector holding portion 13g by the guide members 13f is carried out smoothly, and the positioning of the optical connector 14 with respect to the optical element 16 also can be carried out easily.

The optical connector assembly according to the invention is structured so that the optical connector 14 abuts the urging slant surfaces 14n and the optical connector 14 is held against the optical element 16 by the urging members 13c of the connector holder 13. Thus, when the optical connector 14 is urged by the urging members 13c, because the portion of the urging members 13c that projects above the optical connector 14 is very small or the projection of the urging members 13c above the optical connector 14 can be eliminated, the height of the mounting of the optical connector 14 with respect to the circuit substrate 11 can be made substantially small.

In addition, because the urging members 13c directly contact the urging slant surfaces 14n due to the portion (the connector abutting portion 13h) formed into an arc-shaped plate by curve molding, compared to the case in which, for example, the optical connector is in point contact with a portion having urging members that are in the shape of spheres or the like, there are the advantages that it is possible to avoid the occurrence of local stress concentrations in the optical connector 14 due to the urging force applied to the optical connector 14 from the urging members 13c, and it is possible to realize stable maintenance of the optical function of the optical connector and prevent damage. The shape of the connector abutting portion of an elastic member (urging member) and an urging slant surface of the optical connector are formed so that the abutment range (area) of the connector abutting portion with respect to the urging slant surface is as large as possible in consideration of the function and stability of the optical connector. On this point, a structure in which a connector abutting portion and an urging slant surface are in surface contact is good.

Note that the grooves 14t on both sides of the optical connector 14 and the slant surfaces 14u are not necessary. As long as the concrete shapes of the optical connector 14, the urging members 13c (elastic members) and the like enable the pressing of the optical connector 14 towards the connector holding portion 13g and the engagement and holding (urging) of the optical connector 14 by the urging members 13c, any type of structure may be used. The urging slant surface formed in the optical connector 14 are not limited to being formed on both sides of the optical connector 14, and may be formed at one position or three or more positions on the optical connector. The connector holding portion is not limited to a structure that provides a pair of elastic members (urging members) that engage with the optical connector from both opposing sides, and plural elastic members, one, or three or more may be used. In addition, the positioning recess into which the guide member 13f is inserted is not necessarily limited to a structure in which the positioning recess passes through the optical connector, and a shape that does not open on the upper surface side of the optical connector may be used. In addition, a groove formed in the side portion of the optical connector may be used.

According to the optical connector assembly described above, the space for mounting the optical connector 14 on the circuit substrate 11 is the same as or slightly larger than the space required for the mounting of the photoelectric conversion module 12 on the circuit substrate 11, and thus it is possible to realize a connection between the photoelectric conversion module 12 (specifically, the optical element 16) and the optical fiber 15 on the circuit substrate 11 that is extremely space-saving.

Note that the invention is not limited by the embodiment described above, and of course various modifications are possible.

For example, in the case in which the positioning accuracy of the optical connector with respect to the optical input-output terminal can be sufficiently assured by the insertion of the guide member of the connector holder into the optical connector (including guidance such that the grooves on the optical connector side are aligned with the guide member) or by a member other than a guide member provided on the connector holder, the guide members or members other than guide members may function as the positioning projections.

In the embodiment described above, the urging members 13c that project from the frame body 13d of the connector holder 13 are used as the connector holding portion 13g that urges and holds the optical connector 14 against the circuit substrate 11 (specifically, against the photoelectric conversion module upper surface 12b), but the connector holding portion 13g is not limited to such an embodiment. The connector holding portion 13g may be formed by a member installed on the circuit substrate 11 or by a member formed integrally with the circuit substrate 11.

In the embodiment described above, the light path between the optical fibers 15a and the optical element 16 is deflected 90° by using the reflecting portion 14g, but the deflection angle is not limited to 90°. In addition, it is also possible to apply the optical connector assembly of the invention to configurations in which the optical axis of the distal end of the optical fibers 15a and the optical axis of the optical element 16 coincide.

In addition, the optical input-output terminal provided on the circuit substrate is not limited to an optical element. For example, various structures may be used, such as one in which an end portion of an optical fiber is secured on a circuit board.

In the embodiment described above, the member denoted by reference numeral 11 serves as the circuit substrate. However, the member may be a "substrate" that does not have electronic circuits. The technical term "substrate" means general base materials on which optical elements and the like may be installed or general objects in which an optical input-output terminal may be installed. For example, an optical connector, ferrule, or the like may be used. In addition, the optical element is not necessarily installed on a substrate. For example, the optical element may be installed in a hole formed in the substrate.

Positioning pin is a general term for a projecting member that positions the optical connector and the substrate. As illustrated in the example of an embodiment described above, a metal rod pin may be used for the positioning pin, but is not so limited. For example, a projection that is formed integrally with an optical connector made of resin or a projection formed integrally with a substrate made of resin may be used. A positioning pin that projects from either the optical connector side or the substrate side towards the other and functions to position the optical connector and the substrate is equivalent to the positioning pin of the invention. For example, if projecting portions that project from the optical connector engage the opposite side (the substrate) and functions to position the substrate and the optical connector, then the projecting portions that project from the optical connector can be called a "positioning pins" according to the invention. For example, if projecting portions projecting from the substrate engage a recess (engaging portion) on the optical connector side and thereby function to position the substrate and the optical connector, then the projecting portions can be called "positioning pins" according to the invention. As described above, a positioning pin is a rod pin having a round cross-section, but the cross-sectional shape may also be elliptical, rectangular, square or the like. In addition, the cross-sectional shape may be hollow. Additionally, the number of positioning pins is two, but any number other than two (one or three or more) may be used with the object of improving the positioning accuracy or the like.

A "pin hole (positioning pin hole)" is a general term for the portion with which a positioning pin engages, and is not limited to a pin hole that is a round hole conforming to a rod-shaped pin. If positioning holes function to position a substrate and an optical connector by positioning the positioning pins with high precision by engaging with the positioning pins, these can be referred to as positioning holes according to the invention The optical connector used in the invention can be called a surface mounted optical connector, and the optical connector assembly according to the invention has a structure in which the substrate mounted optical connector is received and held. For example, even if there is no fastening member such as a circuit substrate on which an optical input-output terminal is fastened (for example, a structure in which the connector holder also functions as the fastening member), when there is a structure in which a surface mounted optical connector faces the optical input-output terminal such as a light receiving and emitting element or an optical fiber, it is possible to refer to this structure as forming the optical connector assembly according to the invention.

The invention relates to an optical connector assembly, a connector holder, and an optical connector. According to the invention, a structure is used in which it is possible to carry out very simply the connection between an optical connector and an optical input-output terminal, and furthermore, due to elastic members of the connector holder, urging slant surfaces formed in the optical connector at an angle to the bottom surface of the optical connector are urged, and thereby the optical connector is urged against the optical input-output terminal. Accordingly, it is possible to limit the height of the mounting of the optical connector above the substrate.

While exemplary embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

What is claimed is:

1. An optical connector assembly, comprising:
   a substrate comprising a connection surface and an optical element;
   an optical connector on a distal end of an optical fiber;
   a positioning mechanism, that positions the optical fiber with respect to the optical element to provide an optical connection therebetween, the positioning mechanism comprising a positioning projection on one of the optical connector and the substrate and a corresponding positioning hole on the other of the optical connector and the substrate, the positioning projection or the positioning hole extending in a direction different from an optical axis of the optical fiber at the distal end of the optical fiber;
   a connector holder on the substrate; and
   a guide mechanism comprising a guide member Projecting from one of the optical connector and the connector holder, and a corresponding Positioning recess formed in the other of the optical connector and the connector holder, wherein
   when the optical connector is being connected with the substrate, insertion of the guide member into the corresponding positioning recess commences before insertion of the positioning projection into the positioning hole.

2. An optical connector assembly according to claim 1, wherein the optical connector comprises a light deflection portion arranged to deflect light passing between the optical element and the distal end of the optical fiber, to form the optical connection therebetween.

3. An optical connector assembly according to claim 1, wherein:
   an optical axis of the optical element extends in a first direction; an optical axis of the optical fiber at its distal end extends in a second direction different from the first; and
   the optical connector changes the direction of light exiting the optical fiber to the first direction or light exiting the optical element to the second direction.

4. An optical connector assembly according to claim 1, wherein the connector holder comprises plural resilient members that urge and hold the optical connector against the first region of the substrate between the plural resilient members.

5. An optical connector assembly according to claim 1, wherein the optical connector comprises:
   a bottom surface facing the substrate;
   an upper portion opposite the bottom surface;
   side portions between the upper portion and bottom surface; and
   a slant surface on a first one of the side portions, the slant surface being inclined toward a second one of the side portions as the slant surface extends toward the upper portion; and
   the resilient member engages the slant surface so as to urge and hold the optical connector against the substrate.

6. An optical connector assembly according to claim 5, wherein the resilient member comprises an arc-shaped connector abutting portion that contacts the slant surface in a line contact manner or a surface contact manner.

7. An optical connector assembly according to claim 1, further comprising holding portions provided on the substrate for holding the optical connector therebetween, wherein the optical connector is optically connected to the optical element while being held by the holding portions and while the positioning projection is inserted into the positioning hole.

8. An optical connector assembly according to claim 1, wherein the optical element is an optical input-output terminal of the substrate.

9. A connector holder, mounted on a substrate having an optical element, the connector holder comprising:
   a resilient member urging an optical connector against the connector holder and the substrate to provide an optical connection between the optical element and an optical fiber in the optical connector,
   wherein the optical connector comprises:

a bottom surface facing the substrate;
an upper portion opposite to the bottom surface;
side portions between the upper portion and the bottom surface; and
a slant surface on a first one of the side portions, the slant surface being inclined toward a second one of the side portions as the slant surface extends toward the upper portion; and
the resilient member engages the slant surface to urge and hold the optical connector against the substrate.

10. A connector holder according to claim 9, comprising plural resilient members that urge and hold the optical connector against a first region of the substrate between the plural resilient members.

11. A connector holder according to claim 9, wherein the resilient member comprises an arc-shaped connector abutting portion that contacts the slant surface in a line contact manner or a surface contact manner.

12. A connector holder according to claim 9, further comprising a guide member projecting from the connector holder, the guide member being adapted to be inserted into a positioning recess in the optical connector, wherein when the optical connector is urged against the substrate by the resilient member, the optical connector is positioned by the guide member to enable the optical connection between the optical fiber and the optical element.

13. A connector holder according to claim 9, further comprising an attachment portion attaching the connector holder to the substrate.

14. An optical holder according to claim 9, wherein the optical element is an optical input-output terminal of the substrate.

15. An optical connector for optically connecting an optical fiber to an optical element on a substrate, comprising:
a connector body at a distal end of the optical fiber; and
a positioning feature, that positions the optical fiber with respect to the optical element to provide an optical connection therebetween, the positioning feature comprising a positioning projection or a positioning hole on the connector body, which interface with a corresponding positioning hole or positioning projection, respectively, on the substrate, the positioning projection or the positioning hole extending in a direction different from an optical axis of the optical fiber at the distal end of the optical fiber wherein
the connector body comprises: a bottom surface facing the substrate; an upper portion opposite the bottom surface; side portions between the upper portion and bottom surface; and a slant surface on a first one of the side portions, the slant surface being inclined toward a second one of the side portions as the slant surface extends toward the upper portion,
the substrate comprises a connector holder having a resilient member that urges and holds the connector body against the optical element,
the resilient member engages the slant surface so as to urge and hold the connector holder against the substrate,
the connector body further comprises a lower slant surface formed on the first one of the side portions, the lower slant surface being inclined toward the second one of the side portions as the lower slant surface extends toward the bottom surface, and
the lower slant surfaces push out the resilient member when the connector body is pressed toward substrate.

16. An optical connector according to claim 15, further comprising a light deflection portion arranged to deflect light passing between the optical element and the distal end of the optical fiber, to form the optical connection therebetween.

17. An optical connector according to claim 15, wherein:
an optical axis of the optical element extends in a first direction;
an optical axis of the optical fiber at its distal end extends in a second direction different from the first; and
the optical connector changes the direction of light exiting the optical fiber to the first direction or light exiting the optical element to the second direction.

18. An optical connector according to claim 15, further comprising a glass plate fixed to the connector body, wherein the optical fiber is interposed between the connector body and glass plate.

19. An optical connector according to claim 18, wherein the glass plate forms a portion of a bottom surface, facing the substrate, of the connector body.

20. An optical connector according to claim 18, further comprising a positioning groove, formed on the connector body, that positions the optical fiber interposed between the connector body and glass plate.

21. An optical connector according to claim 15, wherein the connector body comprises plural slant surfaces.

22. An optical connector according to claim 15, wherein the optical element is an optical input-output terminal of the substrate.

23. An optical connector assembly, comprising:
a substrate comprising a connection surface and an optical element;
an optical connector on a distal end of an optical fiber;
a positioning mechanism, that positions the optical fiber with respect to the optical element to provide an optical connection therebetween, the positioning mechanism comprising a positioning projection on one of the optical connector and the substrate and a corresponding positioning hole on the other of the optical connector and the substrate, the positioning projection or the positioning hole extending in a direction different from an optical axis of the optical fiber at its distal end;
a connector holder on the substrate, the connector holder comprising a resilient member that urges and holds the optical connector against the substrate; and
a guide mechanism comprising a guide member projecting from one of the optical connector and the connector holder, and a corresponding positioning recess formed in the other of the optical connector and the connector holder, wherein
when the optical connector is being connected with the substrate, insertion of the guide member into the corresponding positioning recess commences before insertion of the positioning projection into the positioning hole.

* * * * *